Figure 3:
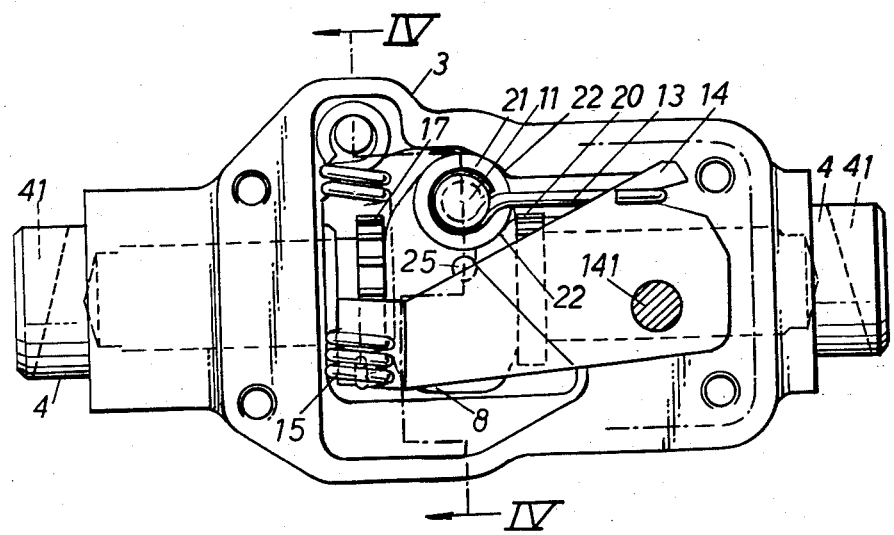

United States Patent [19]
Clay et al.

[11] 3,805,926
[45] Apr. 23, 1974

[54] FRICTIONAL COUPLINGS
[75] Inventors: Benjamin Andrew Clay, Stourbridge; Albert Charles Hill, Acocks Green, both of England
[73] Assignee: Girling Limited, Birmingham, England
[22] Filed: Mar. 28, 1972
[21] Appl. No.: 238,978

Related U.S. Application Data
[63] Continuation of Ser. No. 49,493, June 24, 1970, abandoned.

[30] Foreign Application Priority Data
July 1, 1969 Great Britain................ 33182/69

[52] U.S. Cl........ 188/79.5 P, 188/196 BA, 188/331
[51] Int. Cl.......................................... F16d 51/52
[58] Field of Search......... 188/79.5 P, 196 BA, 217, 188/331

[56] References Cited
UNITED STATES PATENTS
2,326,995  8/1943  Eksergian ........................ 188/331
2,081,521  5/1937  White ................................ 188/331
2,246,242  6/1941  Chase ................................ 188/331
3,420,340  1/1969  Hopf................................ 188/79.5 P FOREIGN PATENTS OR APPLICATIONS
1,016,136  9/1957  Germany ........................... 188/331

707,547  4/1954  Great Britain..................... 188/331

Primary Examiner—Duane A. Reger
Attorney, Agent, or Firm—Scrivener Parker Scrivener & Clarke

[57] ABSTRACT

A drum brake of the two leading shoe type has, in place of one of the conventional two actuating devices, a unit which transmits a reduced force from the trailing end of one shoe to a leading end of the subsequent shoe, the balance of the force being transmitted to the torque plate. The unit can include a cam which is profiled to provide a desired relationship between the originating force and the reduced force. The cam can be journalled in such a way that reverse forces cannot be transmitted to the torque plate. This causes the brake to act as a "duo-servo" in the reverse sense of rotation. Automatic and/or manual adjustment for brake wear can be achieved and an automatic adjustment operating on actuation of the brake in the reverse sense is described.

11 Claims, 4 Drawing Figures

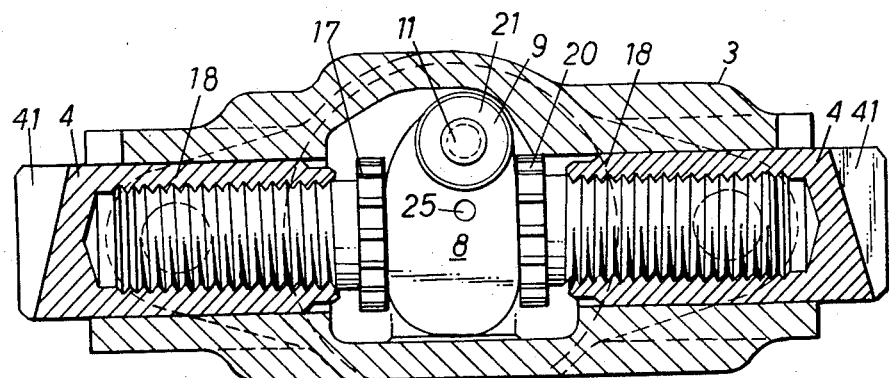
—FIG. 2.—
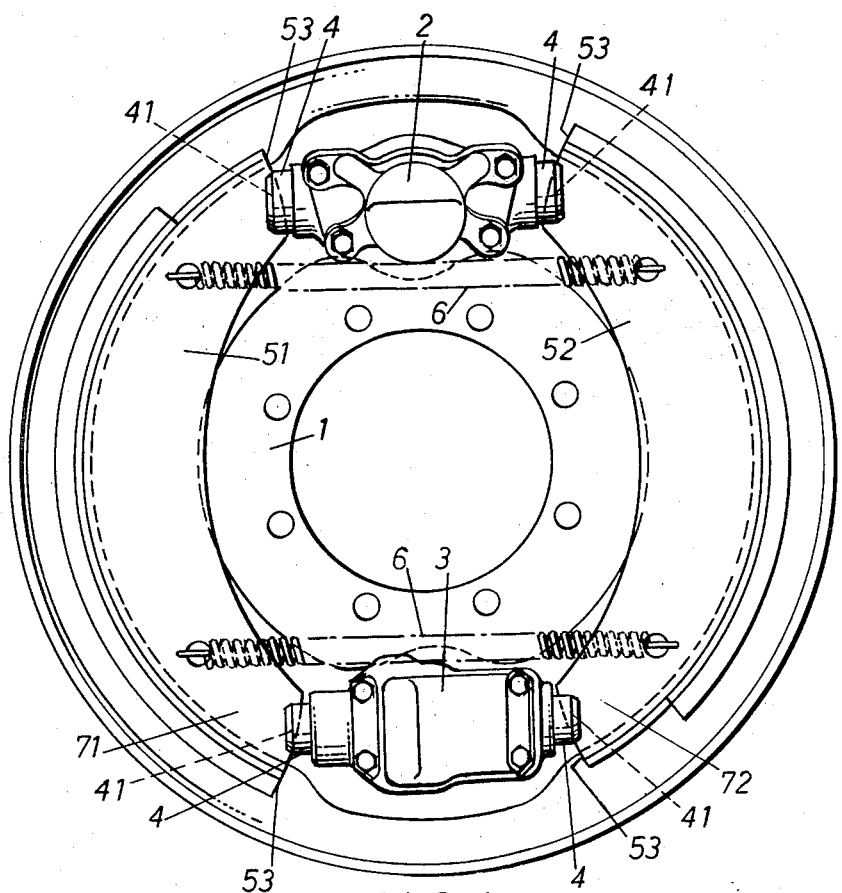
—FIG. 1.—

3,805,926

FRICTIONAL COUPLINGS

This is a continuation of U.S. Pat. application Ser. No. 49,493, filed June 24, 1970, now abandoned.

The present invention relates to frictional couplings and in particular concerns a drum brake with two leading shoes.

THE BACKGROUND OF THE INVENTION FOLLOWS

In drum brakes of the two leading shoe type, the leading edges of the shoes are pushed against the brake drum whose rotation assists in urging the brake shoe against the drum. This type of brake is therefore very efficient.

The extreme case is the so-called duo-servo brake in which the trailing end of one shoe applies a larger force than that exerted by the brake actuating device on the leading end of that shoe to the leading end of the other shoe. This of course increases the wear on the other shoe and to balance the wear on both shoes, two actuating devices are commonly used.

THE PRESENT INVENTION PROVIDES

A frictional coupling comprising
a. a drum having an internal cylindrical periphery,
b. a plurality of arcuate shoes normally spaced from but adjacent the internal periphery of the drum, and each shoe having a leading end and a trailing end, each of which cooperates with an end of a neighbouring shoe to form a pair of adjoining ends, and
c. an actuating device for pushing at least one of a pair of adjoining ends away from the other to cause it to contact said periphery,
d. characterised by a unit disposed between the other or each other pair of adjoining ends to transmit a reduced force from the trailing end of one shoe to a leading end of another shoe.

In this specification a leading end and a trailing end refer to the normal direction of rotation and an end referred to as, for example, the leading end does not change its description because the direction of rotation is reversed although naturally its performance changes.

Whilst the actuating device will normally be double-acting, it is apparent that provided the actuating device is forcibly extendable it will push the contacting ends of the brake shoes apart. For heavy duty applications, it may be advisable to have a single-acting actuating device so that large braking forces in one of the two senses of rotation can be applied to a rigid housing of the actuating device rather than to the internal mechanism thereof. However this leads to a more complex design of the reduced force transmitting unit and is preferably avoided.

This unit can be in the form of a cam pivoted at one end and so arranged that when it is pushed by the trailing end it takes up a position wherein that end presses against the cam near the pivot, with the cam pressing against the leading end remotely from the pivot to give the mechanical disadvantage required by the precise geometry of the coupling.

It is possible to incorporate in this frictional coupling a self-adjusting mechanism which operates in the reverse direction of rotation.

An embodiment of the invention will now be described, by way of example, with reference to the accompanying drawings.

IN THE DRAWINGS

Figure 4:
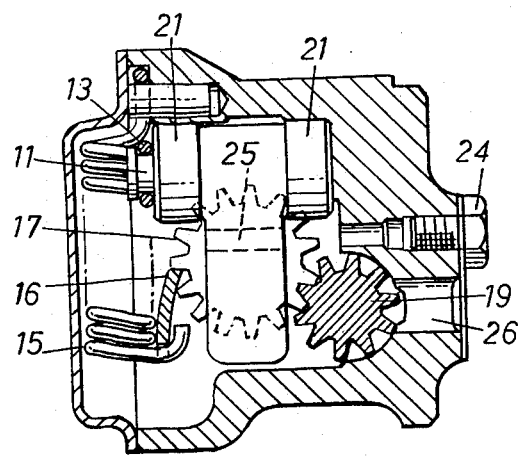

FIG. 1 is a view on a torque or back-plate of a drum brake with the drum removed for purposes of illustration, FIG. 2 is a cross-section through a unit for giving a mechanical disadvantage between the two brake shoes shown in FIG. 1, FIG. 3 is a view on the torque plate side of the unit of FIG. 2 with a cover plate removed and shows an automatic adjuster, and FIG. 4 is a section through the unit along the line IV—IV of FIG. 3.

A DETAILED DESCRIPTION OF AN EMBODIMENT FOLLOWS

FIG. 1 shows a torque plate 1 on which are mounted an actuator 2 and a unit 3 whose function will be described hereinafter. The actuator 2 and the unit 3 have ram-like opposed plungers 4 with grooves 41 in them in which fit slippers or other surfaces 53 of brake shoes 51 and 52 which are held firmly seated in the grooves by means of pull-off springs 6.

The actuator can be of any type of brake expander such as a hydraulic, wedge or cam operated actuator. The unit 3 serves to provide a mechanical disadvantage between the force exerted on it by the trailing end 71 of the shoe 51 that follows the actuator in the normal or forward direction of rotation and to exert a lower force on the leading edge 72 of the subsequent shoe 52.

It performs this function by means of a cam 8 pivotal at one end 9 which is contacted by the unit's plungers 4. This cam is profiled so that when the trailing end 71 of a shoe urges the associated plunger against the cam, the cam tilts and presents a portion of its periphery nearer the pivot end 9 to the plunger. At the same time the pivoting of the cam presents a part of the cam surface more remote from the pivot to the plunger acting on the leading end 72 of the succeeding shoe 52 and therefore there is a mechanical disadvantage between the force exerted by the trailing end and that exerted on the leading end of the subsequent shoe. It will be obvious that there is a resultant force on the unit which is transferred to the torque plate 1.

The cam 8 is pivoted on both its axial faces by means of trunnions 21 which engage in seatings 22 arranged in a half-bearing like manner so that the cam transmits the resultant or reaction force to the torque plate during normal rotation but is unable to do so in the opposite direction with the result that a like pivotal and mechanical disadvantage action does not occur when the drum is rotating in the reverse direction but instead the brake works as a "duo-servo." It will be apparent that instead of the trunnions 21 on the cam fitting in half-bearing-like seatings, the same effect can be obtained by having the unit 3 sliding on the torque plate 1. In the forward sense of rotation any freedom is soon taken up but in the reverse sense of direction there is no mechanical disadvantage provided by the unit.

To provide a self-adjusting facility to the brake, there is attached to a pin 11 extending from one of the trunnions 21 of the cam a tie 13 which pulls on a lever 14 pivotal about a bearing pin 141 against a bias provided by a return spring 15 (during braking in the reverse direction of rotation when the trunnions move from their seatings). This lever carries a pawl 16 which on a return movement of the lever under the bias engages and turns a ratcheting gear wheel 17 to extend the length of the plungers 4 by means of screw action 18. It will be appreciated that the spring 15 also serves, through the tie 13, to hold the trunnions in their seatings.

It will be obvious that the plungers are axially spaced and therefore that a lay shaft 19 must be used to transmit the motion from the ratchet gear wheel 17 to a slave wheel 20 associated with the other plunger. Sliding movement of the trunnions in the seatings (or of the unit in the base plate) is thus used to actuate the lever to turn the ratchet wheel and the slave wheel to alter the effective length of the two plungers and thus to adjust the brake mechanism. One of the plungers will of course be oppositely threaded to the other to get the correct balance of adjustment.

Manual adjustment of the brake is of course, possible even when automatic adjustment is used. As can be seen in FIG. 4 it is easy to disengage the pawl 16 on the lever and to turn the ratchet wheel by a screw-driver or the like to provide the adjustment. For example, the pawl could be lifted by a rod or screw driver inserted in the hole normally sealed by bolt 24 and an aligned hole 25 in the cam 8 to abut the lever 14 and another screw-driver or rod inserted in aperture 26 could be used to prize the lay shaft 19 around.

In some designs there may be problems due to the variation in width of the cam and therefore between the ends 71 and 72. For example, if a vehicle is driven uphill and braked either by the parking brake or by the main brake, the unit 3 will be extended until the vehicle has come to rest and is tending to run backward and then the unit will be retracted so that ends 71 and 72 can approach each other releasing the brake. The parking brake would incorporate some resiliency to counteract this but any resiliency in the main brake is objectionable and is termed sponginess. This is counteracted practically by having the mechanical disadvantage in one direction only so that the brake requires further actuation but does not kick-back. It can be calculated that for optimum performance of hydraulically operated brakes in this respect, the two ends of the actuators should have equal diameters. This is especially the case when a split hydraulic system is used when each end of an actuator is fed from an independent hydraulic circuit; in this case each hydraulic circuit should feed equal numbers of leading and trailing ends of the actuators.

A mechanical disadvantage of 1:3 has been found suitable. This of course varies with brake design and lining material. If the ratio is wrong one or other shoe will wear more than the other. The unit self-adjusts on the basis of the first shoe ignoring the wear on the second shoe with the result that the second shoe can be adjusted either into rubbing engagement (which is immaterial since the second shoe is the hydrostatic shoe) or so that its clearance increases. It is therefore apparent that the mechanical disadvantage should be selected so that ideally both shoes wear at the same rate but any latitude should preferably be such as to cause the first shoe to wear more than the second.

We claim:

1. A frictional coupling such as an internal shoe drum brake comprising:

a. a drum having an internal cylindrical periphery,
   b. a plurality of arcuate shoes disposed around said drum, normally spaced from but adjacent the internal periphery of the drum and each shoe having two ends,
   c. a torque plate from which the shoes are carried,
   d. an actuating device for pushing at least one of a pair of adjoining ends away from the other of the pair to cause the shoes to contact said periphery, and
   e. a unit disposed between another pair of adjoining ends to transmit a reduced force from an end of one shoe to an end of another shoe, the invention residing in that the unit comprises a plurality of members forming a strut between the respective ends and displaceable relative to the torque plate as the shoes are drawn round by the drum during brake operation, in that there are a pair of abutment surfaces, one fixed in relation to the torque plate and the other being on one of the members, which surfaces are disposed for engagement whereby both surfaces are located relative to the torque plate as a result of displacement of the strut by the drum in a first, preferred, direction of drum rotation but for disengagement by displacement of the strut in a second, non-preferred, direction of drum rotation, and in that the member having the abutment surface is displaceable relative to the remainder of the strut in such a way that the strut is held in a condition of minimum length which remains constant whatever force is applied to the strut by the shoe ends whereby the force is transmitted unmodified except when a force is derived from the abutment surfaces during engagement thereof, and in such a way that a force from the abutment surfaces when engaged will displace the said member having the abutment surface to cause elongation of the strut and will oppose the braking forces to give a desired reduced force in the preferred direction of drum rotation.

2. A frictional coupling according to claim 1 wherein the unit further comprises a housing containing said members, the housing being fast to the torque plate, and wherein said members comprise a pair of linearly slidable members journalled in the housing at opposite ends thereof and projecting therefrom into engagement with a respective one of the co-operating shoe ends whereby the forces on said shoe ends are defined in both position and direction.

3. A frictional coupling according to claim 2 wherein said members also comprise a pivotal member which is said member having the abutment surface, the other abutment surface being defined by the housing, the pivot of said pivotal member being defined by said abutment surfaces and being so arranged in relation to the plungers that one plunger will exert a force on said pivotal member in a position such as to rotate the pivotal member which engages the other plunger in a position such as to cause a reduction in the transmitted force.

4. A frictional coupling according to claim 3 wherein the abutment surfaces are in the form of trunnions on the pivotal member and a half-bearing-like seatings in the housing, the seatings being so arranged that the trunnions will seat therein as a result of the displacement caused by the drum in the preferred direction of drum rotation but will lift out of the seatings as a result of drum rotation in the non-preferred direction.

5. A frictional coupling according to claim 1 wherein at least one of said members is adjustable in length, and a linkage is provided between the strut and the torque plate to adjust the length of said adjustable length member.

6. A frictional coupling comprising a drum having an internal cylindrical periphery, a plurality of arcuate shoes disposed around said drum normally spaced from but adjacent the internal periphery and each shoe having two ends, a torque plate from which said shoes are carried, an actuating device for pushing at least one of a pair of adjoining ends away from the other of the pair to cause the shoes to contact said periphery, a force transmitting unit disposed between another pair of adjoining ends to transmit servo force from one of said ends to the other thereof, reaction means cooperating with said force transmitting unit and said torque plate to reduce the servo force transmitted through said unit from a first to a second shoe end throughout the period said shoes contact said periphery while rotating in one direction, and means for rendering said reaction means ineffective throughout the period said shoes contact said periphery while rotating in the opposite direction so that servo force is transmitted unmodified through said unit from said second to said first shoe end.

7. A frictional coupling according to claim 4, wherein there is a mechanical linkage operable by movement of said trunnions to adjust the frictional coupling to compensate for wear.

8. A frictional coupling according to claim 7 wherein on at least one of said plungers there is a screw action to vary the length of said plunger, and this screw action is operable by a pawl and ratchet in said linkage.

9. A frictional coupling according to claim 8 wherein said linkage comprises a gear wheel on said screw action and a pivoted lever carrying a pawl for ratchet engagement with said wheel, means biasing said lever to a first position, and a tie interconnecting said trunnion and said lever to effect pivoting thereof against said bias upon movement of said trunnion in said one direction.

10. A frictional coupling according to claim 9 wherein there are oppositely threaded screw actions on the two plungers, each with a gear wheel, the two gear wheels being interconnected by a lay shaft.

11. A frictional coupling according to claim 10 wherein openings are provided in said unit to allow the pawl to be disengaged from the gear wheel by means of a suitable tool and to allow the gear wheel to be adjusted.

* * * * *